April 28, 1936.  R. D. BALL  2,039,050

POLYPHASE ALTERNATING CURRENT MOTOR

Filed March 15, 1934

INVENTOR
Reginald D. Ball
BY O.B. Buchanan
ATTORNEY

Patented Apr. 28, 1936

2,039,050

UNITED STATES PATENT OFFICE 2,039,050

POLYPHASE ALTERNATING CURRENT MOTOR

Reginald D. Ball, Bradford, England, assignor to The English Electric Company Limited, London, England, a company Application March 15, 1934, Serial No. 715,620
In Great Britain March 17, 1933

14 Claims. (Cl. 172—280)

This invention relates to the improvement of the power factor of polyphase motors by the use of capacitors, the motors being of the type having primary and auxiliary windings adapted to act in combination as auto-transformers for stepping up or stepping down the phase voltage for application to the capacitors.

A motor according to the invention is characterized by an auxiliary phase winding which is displaced in phase relatively to that phase of the main winding to which it is connected. The phase displacement between the windings preferably lies between 60° and 90°. The advantage of using phase-displaced auxiliary windings and main windings in pairs is that the design engineer is thereby enabled to cause the relation between the capacitor-voltage and the voltage-per-turn of the main winding to change when a simple change in winding connections is made.

In one form of the invention the main primary windings are star-connected; capacitors are connected between the main terminals and the free ends of the auxiliary windings, the other ends of the auxiliary windings being connected to the star-point of the motor. To reduce starting current the main and auxiliary windings may be temporarily connected in series during the starting period, the capacitors then being connected between the main terminals and the star-point; and this re-grouping may be effected by a simple shifting of the star-point. Alternatively, various known methods of star-delta starting may be employed in conjunction with the invention, and the capacitors may be connected across only one of the windings, which may be either the main or the auxiliary.

Figs. 1 to 4 are diagrammatic views of circuits and apparatus embodying my invention in several different forms.

Figure 1:
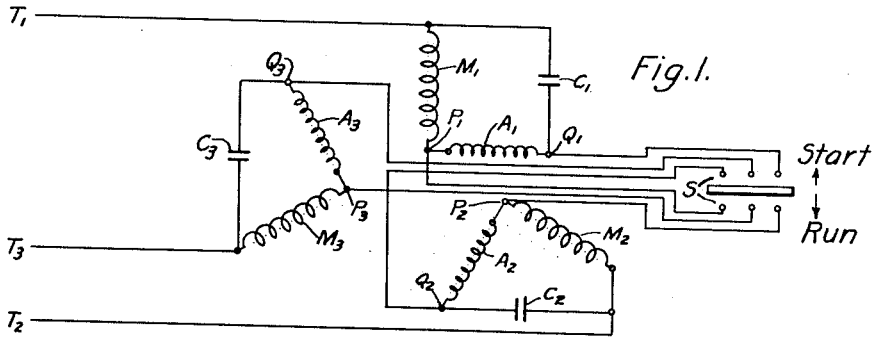

A form of the invention as applied to the primary winding of a three-phase motor is shown in Fig. 1 of the drawing. Main windings $M_1$, $M_2$ and $M_3$ are star-connected, the supply being connected to terminals $T_1$, $T_1$ and $T_3$. I also provide auxiliary or auto-transformer windings $A_1$, $A_2$ and $A_3$ which are connected to the open-star neutral points $P_1$, $P_2$ and $P_3$ of the respective main windings $M_1$, $M_2$ and $M_3$. Between the terminals $Q_1$, $Q_2$ and $Q_3$ of the auxiliary windings and the terminals $T_1$, $T_2$ and $T_3$ of the main windings, respectively, are connected the capacitors $C_1$, $C_2$ and $C_3$. Each auxiliary winding, such as $A_1$ is approximately 90° out of phase with respect to its corresponding main winding such as $M_1$. The numbers of turns and the phase-angles of the auxiliary windings are chosen to give the required potential-differences across the capacitors, a particularly useful arrangement being one which impresses on the capacitors a potential-difference lying between the phase, or line-to-neutral, voltage and the line-to-line voltage, commonly called the line voltage.

If, during starting, the three junctions $P_1$, $P_2$ and $P_3$ of the main and auxiliary windings be disconnected temporarily from the star-point $P$, and the points $Q_1$, $Q_2$ and $Q_3$ be temporarily connected together, the main and auxiliary windings will be in series and the capacitors will have the phase voltage applied to them. This arrangement, which results in a reduction of starting current, is shown in Fig. 1 of the drawing, wherein the switch $S$, in the upper or starting position, connects together points $Q_1$, $Q_2$ and $Q_3$, while when it is in the lower or running position it connects together the points $P_1$, $P_2$ and $P_3$. To avoid opening the circuit of the motor during transition the switch $S$ may be adapted to connect together momentarily all six points $P_1$, $P_2$, $P_3$, $Q_1$, $Q_2$ and $Q_3$.

Figure 2:
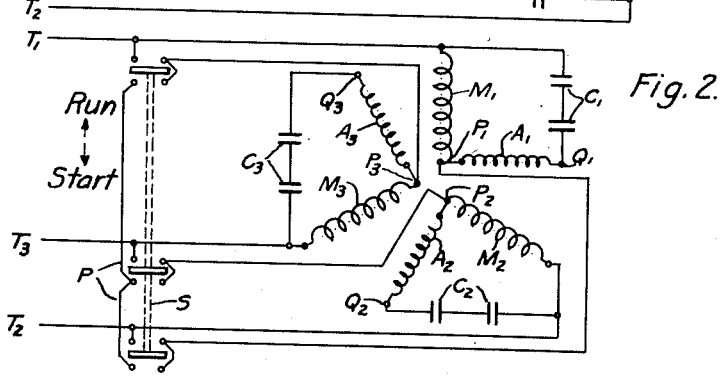

Alternatively, the motor may be star-connected for starting, and re-arranged with the main phase windings in delta for running, as shown in Fig. 2 of the accompanying drawing. For running, the switch $S$ is in the upper position and the point $P_1$ at the junction of main phase winding $M_1$ and auxiliary phase winding $A_1$ is connected to the outer end of main phase $M_2$. Similarly, the point $P_2$ is connected to the outer end of main phase winding $M_3$ and the point $P_3$ to the outer end of the main phase winding $M_1$. With this arrangement, the voltage across the capacitor may be greater than the line voltage, and hence it will in many cases be preferable to use at least two capacitors in series, so as to divide the voltage between them.

Figure 3:
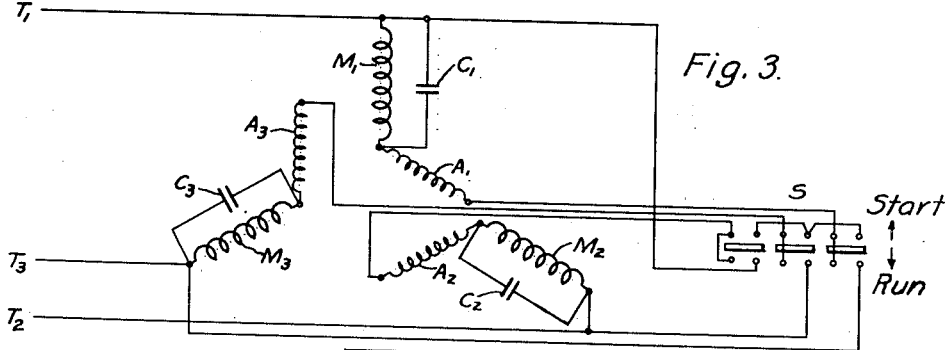

Another form of the invention is shown in Fig. 3 of the drawing. Here the auxiliary winding $A_1$ is in series with the main winding $M_1$ and has a phase displacement of approximately 60° thereto. The capacitor $C_1$ is connected across the terminals of either one of the serially connected windings $M_1$ and $A_1$, for example the winding $M_1$. The capacitors $C_2$ and $C_3$ and the auxiliary windings $A_2$ and $A_3$ of the other phases are similarly connected and related to the main windings $M_2$ and $M_3$, the supply being connected to terminals $T_1$, $T_2$ and $T_3$. For star-connection, for starting, the three free ends of the auxiliary windings $A_1$, $A_2$ and $A_3$ are connected together. For delta connection, for running, the free end of the auxiliary winding $A_1$ is connected to terminal $T_3$, that of $A_3$ to $T_2$ and that of $A_2$ to $T_1$. A switch S may be provided, as shown, for making these connections in sequence, for star-delta starting.

Figure 4:
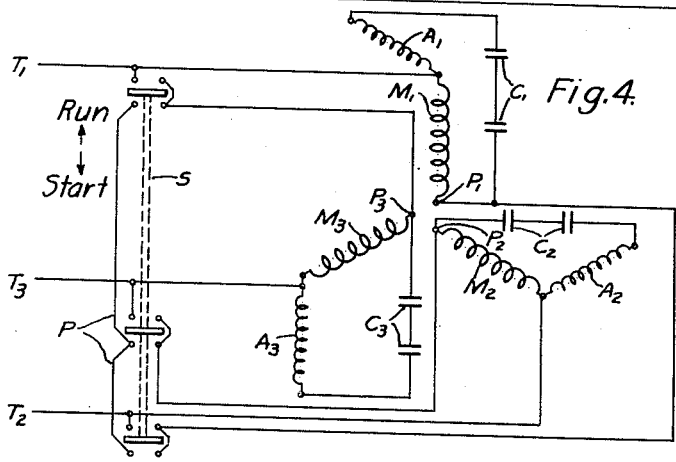

In yet another form of the invention shown in Fig. 4 of the accompanying drawing, the terminal $T_1$ is connected to the junction of the main phase winding $M_1$ with the auxiliary phase winding $A_1$, while one or more capacitors $C_1$ are connected between the other terminals of the windings $M_1$ and $A_1$. The other phases are each similarly connected. Each auxiliary phase winding is shown in the drawing inclined at approximately 60° to its corresponding main phase winding. For starting, the three main phase windings are star connected, the switch S being in the lower position to connect together the ends $P_1$, $P_2$ and $P_3$ of the main phase windings. During running, the switch S is in the upper position to put the main phase windings in delta connection, the point $P_1$ being connected to the terminal $T_2$, the point $P_2$ to $T_3$, and the point $P_3$ to $T_1$. Thus, during running, the arrangement is substantially the same as in Fig. 2.

I claim as my invention:

1. A polyphase dynamo-electric machine having main polyphase windings, auxiliary polyphase windings connected to and displaced in phase relatively to the respective corresponding phases of the main windings, a plurality of capacitors at all times associated with the respective phases of the main and auxiliary windings, the connections being such that the capacitors have potential-differences that have been altered by the presence of the auxiliary windings, and switching means for making a simple change in the electric supply connections to the windings, for starting and running conditions, respectively, so as to simultaneously change the ratio between the capacitor-voltage and the voltage-per-turn of the main winding.

2. A star-connected polyphase dynamo-electric machine having main polyphase windings, auxiliary polyphase windings connected to and displaced in phase relatively to the respective corresponding phases of the main windings, the junction of the main and auxiliary windings being the star-point, and a plurality of capacitors respectively connected between the free ends of the several pairs of connected main and auxiliary windings.

3. A polyphase motor, star-connected for running, and having main polyphase windings, auxiliary polyphase windings connected to and displaced in phase relatively to the respective corresponding phases of the main windings, the junction of the main and auxiliary windings being the star-point, and a plurality of capacitors respectively connected between the free ends of the several pairs of connected main and auxiliary windings, and means operative, for starting conditions, to break the running phase-connections and to connect the free ends of the auxiliary windings to a star point.

4. A polyphase motor, mesh-connected for running, and having polyphase main and auxiliary windings connected in series, the auxiliary polyphase windings being displaced in phase relatively to the respective corresponding phases of the main windings, and a plurality of capacitors so associated with the respective phases of the main and auxiliary windings as to have potential-differences that have been altered by the presence of the auxiliary windings, and means operative, for starting conditions, to break the running phase-connections and to connect the free ends of the auxiliary windings to a star point.

5. A polyphase motor, star-connected for starting, and having main polyphase windings, auxiliary polyphase windings connected to and displaced in phase relatively to the respective corresponding phases of the main windings, the junction of the main and auxiliary windings being the star-point, and a plurality of capacitors respectively connected between the free ends of the several pairs of connected main and auxiliary windings, and means operative, for running conditions, to disconnect the junctions of the several pairs of main and auxiliary windings from the star point and to connect said junctions to other terminals of the motor so that the main windings are in mesh connection.

6. A polyphase dynamo-electric machine having main polyphase windings, auxiliary polyphase windings connected to and displaced in phase relatively to the respective corresponding phases of the main windings, means for energizing said machine with the connected pairs of main and auxiliary windings connected in series in the respective phases, a plurality of capacitors at all times associated with the respective phases of the main and auxiliary windings, the connections being such that the capacitors have potential-differences that have been altered by the presence of the auxiliary windings, and switching means for making a simple change in the electric supply connections to the windings, for starting and running conditions, respectively, so as to simultaneously change the ratio between the capacitor-voltage and the voltage-per-turn of the main winding.

7. A polyphase dynamo-electric machine having main polyphase windings, auxiliary polyphase windings connected to and displaced in phase relatively to the respective corresponding phases of the main windings, a plurality of capacitors, means for energizing said machine with the main windings connected directly across a polyphase supply, means for energizing the auxiliary windings from said supply, with the respective phases of the auxiliary windings each in series with a capacitor at all times, the connections being such that the voltage conditions affecting the capacitors are modified as a result of the phase-displacement between the corresponding phases of the main and auxiliary windings, and switching means for making a simple change in the electric supply connections to the windings, for starting and running conditions, respectively, so as to simultaneously change the ratio between the capacitor-voltage and the voltage-per-turn of the main winding.

8. A polyphase dynamo-electric machine having main polyphase windings, auxiliary polyphase windings connected to and displaced in phase relatively to the respective corresponding phases of the main windings, a plurality of capacitors so associated with the respective phases of the main and auxiliary windings as to have potential-differences that have been altered by the presence of the auxiliary windings, and switching means for making a change in connections of a supply-circuit whereby diverse starting and running conditions are obtained and simultaneously, and by the same means, the relation between the capacitor-voltage and the voltage-per-turn of the main winding is changed.

9. A mesh-connected polyphase dynamo-electric machine having polyphase main and auxiliary windings connected in series, the auxiliary polyphase windings being displaced in phase relatively to the respective corresponding phases of the main windings, a plurality of capacitors so associated with the respective phases of the main and auxiliary windings as to have potential-differences that have been altered by the presence of the auxiliary windings, and switching means for making a change in connections of a supply-circuit whereby diverse starting and running conditions are obtained and simultaneously, and by the same means, the relation between the capacitor-voltage and the voltage-per-turn of the main winding is changed.

10. A polyphase dynamo-electric machine having main polyphase windings, auxiliary polyphase windings connected to and displaced in phase relatively to the respective corresponding phases of the main windings, the machine having polyphase supply terminals connected to the junctions of the several pairs of main and auxiliary windings, a plurality of capacitors respectively connected between a point on a main winding and a point on an auxiliary winding of the several pairs of connected main and auxiliary windings so that the potential-difference applied to each capacitor is a resultant of two potential-differences derived from the respective main and auxiliary windings, and switching means for making a change in connections of a supply-circuit whereby diverse starting and running conditions are obtained and simultaneously, and by the same means, the relation between the capacitor-voltage and the voltage-per-turn of the main winding is changed.

11. A polyphase dynamo-electric machine having main polyphase windings, auxiliary polyphase windings connected to and displaced in phase relatively to the respective corersponding phases of the main windings, means for energizing said machine with the connected pairs of main and auxiliary windings connected in series in the respective phases, a plurality of capacitors so associated with the respective phases of the main and auxiliary windings as to have potential-differences that have been altered by the presence of the auxiliary windings, and switching means for making a change in connections of a supply-circuit whereby diverse starting and running conditions are obtained and simultaneously, and by the same means, the relation between the capacitor-voltage and the voltage-per-turn of the main winding is changed.

12. A polyphase dynamo-electric machine having main polyphase windings, auxiliary polyphase windings connected to and displaced in phase relatively to the respective corresponding phases of the main windings, means for energizing said machine with the connected pairs of main and auxiliary windings connected in series in the respective phases, a plurality of capacitors respectively connected between a point on a main winding and a point on an auxiliary winding of the several pairs of connected main and auxiliary windings so that the potential-differences applied to each capacitor is a resultant of two potential-differences derived from the respective main and auxiliary windings, and switching means for making a change in connections of a supply-circuit whereby diverse starting and running conditions are obtained and simultaneously, and by the same means, the relation between the capacitor-voltage and the voltage-per-turn of the main winding is changed.

13. A polyphase dynamo-electric machine having main polyphase windings, auxiliary polyphase windings connected to and displaced in phase relatively to the respective corresponding phases of the main windings, means for energizing said machine with the connected pairs of main and auxiliary windings connected in series in the respective phases, a plurality of capacitors so associated with the respective pairs of main and auxiliary windings as to have potential differences derived from only one winding of each of the respective pairs, and switching means for making a change in connections of a supply-circuit whereby diverse starting and running conditions are obtained and simultaneously, and by the same means, the relation between the capacitor-voltage and the voltage-per-turn of the main winding is changed.

14. A polyphase dynamo-electric machine having main polyphase windings, auxiliary polyphase windings connected to and displaced in phase relatively to the respective corresponding phases of the main windings, a plurality of capacitors, means for energizing said machine with the main windings connected directly across a polyphase supply, means for energizing the auxiliary windings from said supply, with the respective phases of the auxiliary windings each in series with a capacitor, and switching means for making a change in connections of a supply-circuit whereby diverse starting and running conditions are obtained and simultaneously, and by the same means, the relation between the capacitor-voltage and the voltage-per-turn of the main winding is changed.

R. D. BALL.